United States Patent [19]

Powell et al.

[11] 4,405,265
[45] Sep. 20, 1983

[54] METHOD AND APPARATUS FOR THE CONTINUOUS TRANSFER OF PARTICULATES FROM A LIQUID CONVEYING MEDIUM TO A GASEOUS CONVEYING MEDIUM

[75] Inventors: John E. Powell; Andrian J. C. Powell, both of Pittsburgh, Pa.

[73] Assignee: Beloit Corporation, Beloit, Wis.

[21] Appl. No.: 245,078

[22] Filed: Mar. 18, 1981

[51] Int. Cl.³ .............................................. B046 15/08
[52] U.S. Cl. ..................................... 406/109; 127/19
[58] Field of Search ................. 406/109, 171, 173, 52, 406/122, 197; 233/113; 127/14; 210/360.2, 369

[56] References Cited

U.S. PATENT DOCUMENTS

| | | | |
|---|---|---|---|
| 3,496,016 | 2/1970 | Siepe et al. | 127/19 |
| 3,650,465 | 3/1972 | Grimwood et al. | 127/19 X |
| 3,730,769 | 5/1973 | Fiedler | 127/19 |
| 4,017,022 | 4/1977 | Fiedler | 127/19 X |

*Primary Examiner*—John J. Love
*Assistant Examiner*—L. E. Williams
*Attorney, Agent, or Firm*—Buell, Blenko, Ziesenheim & Beck

[57] ABSTRACT

The specification discloses a method and apparatus for continuously transferring particulates from a liquid conveying medium to a gaseous conveying medium in which a liquid medium containing solid particulates is injected into a rotating centrifuge basket where the particulates are removed with the aid of centrifugal and pneumatic force. The deliquified particulates are continuously emitted from the centrifuge into a pick-up chamber where they are instantly received by a flowing gaseous conveying medium which transports them to a desired location. The method and apparatus of this invention are particularly useful in the mining industry.

8 Claims, 4 Drawing Figures

METHOD AND APPARATUS FOR THE CONTINUOUS TRANSFER OF PARTICULATES FROM A LIQUID CONVEYING MEDIUM TO A GASEOUS CONVEYING MEDIUM

This invention relates to a method and an apparatus for continuously transferring particulates from a liquid-solid mixture to a gaseous conveying medium by a centrifuge arrangement, wherein a pneumatic force is used to promote travel of the gaseous flow through the apparatus and separation of the liquid from the particulates. This invention is particularly useful for removing solid particulates from a slurry mixture for the purpose of backfilling mine cavities.

It is customary in the mining industry to backfill mine cavities with refuse produced when coal or ore has been beneficiated from the earth. This process is accomplished by mixing the refuse with water and pumping the resulting slurry through pipelines to working places, or stopes, where mining has occurred. The slurry is released into the stopes and is retained with barricades or porous dams. The solids in the slurry mixture settle leaving the water to drain through the barricades or dams. The solids are thus left in place where settled.

Although universally used, this method of filling mine openings has several disadvantages, including:

(i) uncontrolled flow of water through the mine workings downstream of the barricades, (ii) ineffective settling of fines and slimes in the slurry mixture resulting in their escape with drainage of the water, (iii) wear problems in pumps and pipework conveying water from the mine brought on by the presence of suspended fines in the water, and (iv) a potentiality of life imperiling avalanches of unconsolidated matter resulting from ineffective water drainage from the slurry mixture.

The present invention avoids all of these problems by producing a high density backfill material which is transported to the filling site by a pneumatic conveying system.

In the preferred embodiment of the invention, the slurry mixture traverses the mine cavities and roadways in a pipeline and is delivered to a centrifuge basket so that the solid and liquid components of the mixture are separated. A pneumatic system then transfers the solids via pipeline to mine cavities where they are expelled with all the advantages of dry placement backfilling, including complete filling, firm compaction, and minimal fluid runoff. The overall system has the advantage that water is drained at the centrifuge and returned to the surface of the mine without flooding the mine floor and creating hazardous conditions.

We provide for a centrifuge apparatus to assist in the continuous transfer of particulates from a liquid conveying medium to a gaseous conveying medium. The apparatus contains a conical centrifuge basket rotatably mounted at its apex within an air-tight housing. The basket has a plurality of holes in its wall. The holes are sized so that a liquid conveying medium may pass through the holes and leave within the basket the deliquified particulates which were transported by the liquid medium. The basket is open opposite its apex. An air-tight pick-up chamber is sealed to the air-tight housing so that it surrounds the open end of the basket. The preferred embodiment of the pick-up chamber incorporates a U-shaped passageway open to the rim of the basket over a 180° arc. The pick-up chamber contains both an input means and an output means to provide for the passage of a pneumatic path of gaseous conveying medium through the apparatus. We prefer to position the input and output means so as to promote the travel of the pneumatic path through the pick-up chamber in a circumferential manner for maximum pick-up of particulates along a 180° arc over which the pick-up chamber is open at the rim of the centrifuge basket. A channelling means is attached to the wall of the apparatus to provide for the injection of liquid conveying medium into the base of the centrifuge basket. A drive means is attached to the housing and to the basket to provide for rotation of the basket. We further prefer to provide a bleeder valve attached to the wall of the apparatus and positioned to promote passage of a gaseous conveying medium through the holes of the basket. We also prefer to provide an output means attached to said housing to promote the expulsion of liquid conveying medium from the apparatus. The output means contains a valve to prevent expulsion of gaseous conveying medium from the apparatus.

We provide a method for continuously transferring particulates from a liquid conveying medium to a gaseous conveying medium, wherein a liquid-solid mixture is injected under gravimetrical head into an inverted cone-shaped centrifuge basket. Delivery is made to the center of the basket by an open discharge pipe. The centrifuge basket is rotated at a sufficient velocity for a sufficient period of time to expel the liquid conveying medium through holes in the basket and to promote the travel of deliquified particulates within said basket toward the open top of the basket located opposite its apex. After the deliquified particulates reach the opening, they are expelled into a surrounding air-tight pick-up chamber. A gaseous conveying medium traveling in a pneumatic path is injected into the air-tight pick-up chamber and receives the deliquified particulates. The pneumatic path diminishes neither the radial nor the tangential components of velocity of the particulates. In fact, the pneumatic path complements the tangential velocity of the particulates in conveying them in a circumferential manner about the opening of the basket before ejecting them from the apparatus. The space confined by the centrifuge basket is pressurized by the pneumatic path injected into the pick-up chamber. This pressurization occurs because the basket is enclosed in an air-tight housing sealed to the air-tight pick-up chamber. A pressure drop is created through the holes of the basket by means of bleeding the gaseous conveying medium from the housing. The net effect of pressurizing the basket and creating a pressure drop through the holes of the basket is to assist with the deliquification of the liquid-solid mixture. The liquid conveying medium passing through the holes of the basket is accumulated in the air-tight housing. A discharge means coupled with a valve expells the liquid conveying means from the apparatus without expelling the gaseous conveying medium.

We further provide a method of utilizing refuse produced from mining operations to fill mine cavities with high density material. A slurry which is rejected from a mineral concentrator, or which is produced by mixing refuse matter with water, is channeled into a pipeline means. The contents of the pipeline are then passed through a cyclone apparatus for removal of excess water and slimes. The discharge product of the cyclone is then channeled into a pipeline. The contents of the pipeline are then injected into a centrifuge apparatus which separates the liquid and solid components by utilizing both centrifugal and pneumatic force. The liquid component, in the form of water, is pumped to a suitable location for storage or further use. The solid component, in the form of deliquified particulates, is entrained in the pneumatic path of a gaseous conveying system and then conveyed via pipeline to stopes and used as high-density fill. Owing to the efficient centrifuge operation (utilizing pneumatic as well as centrifugal force in separating the particulates from the slurry) and to the fact that acceptable fill may contain as much as 10% moisture, the centrifuge designed for this particular method may be physically smaller than corresponding centrifuges handling like quantities of input material.

The apparatus of this invention can be used for hoisting materials out of mines. For such an application we prefer that minerals be conveyed over long distances in mines by a hydraulic slurry pipeline. At a location near the shaft bottom, the slurry is separated into its liquid and solid components. This separation is accomplished by first subjecting the slurry to a rough scalping operation, such as processing through a cyclone or a sieve bend. The smaller particles extracted by the scalping operation are then introduced into a centrifuge apparatus. Deliquified mineral particulates emitted from the centrifuge apparatus are hoisted to the shaft opening by a pneumatic conveying sytem which also hoists any other mineral matter introduced into the pneumatic system through an air-lock feeder.

We provide for a pneumatic-hydraulic method of transporting minerals from stopes to the shaft opening. Mineral matter is transported over an extended horizontal distance by means of a liquid conveying medium traveling in a pipeline network. For transportation over an extended vertical distance, mineral matter is isolated by a centrifuge apparatus which expells deliquified particulates of such matter into a gaseous conveying medium traveling in a pneumatic system. Deliquified particulates may be readily re-entrained into a liquid conveying medium for traversing the mineral matter over any additional horizontal distance. This method of confining the horizontal travel of mineral matter to a hydraulic conveying system, while confining vertical travel to a pneumatic conveying system, is more economical than a totally hydraulic mode of transportation.

The apparatus of this invention can also be used for effectuating mineral pick-up during shaft sinking operations which use water to cool cutter discs or to flush cuttings from the outer periphery of the cutting head. In this application, a water-solid mixture is drawn up from the working face by means of a single impeller slurry pump and is delivered to a centrifuge apparatus. Pressurized air is conducted down the shaft and through the centrifuge to receive deliquified particulates. The particulates are hoisted to the mine surface through a pneumatic conveying system. Water discharged from the centrifuge returns to the working face to flush the cuttings to the pick-up place.

Other details, objects and advantages of the invention will become apparent as the following description of a present preferred embodiment thereof and a present preferred method of practicing the same proceeds.

In the accompanying drawings we have shown a present preferred embodiment of the invention and have illustrated present preferred methods of practicing the same in which.

THE CENTRIFUGE APPARATUS

Figure 1:
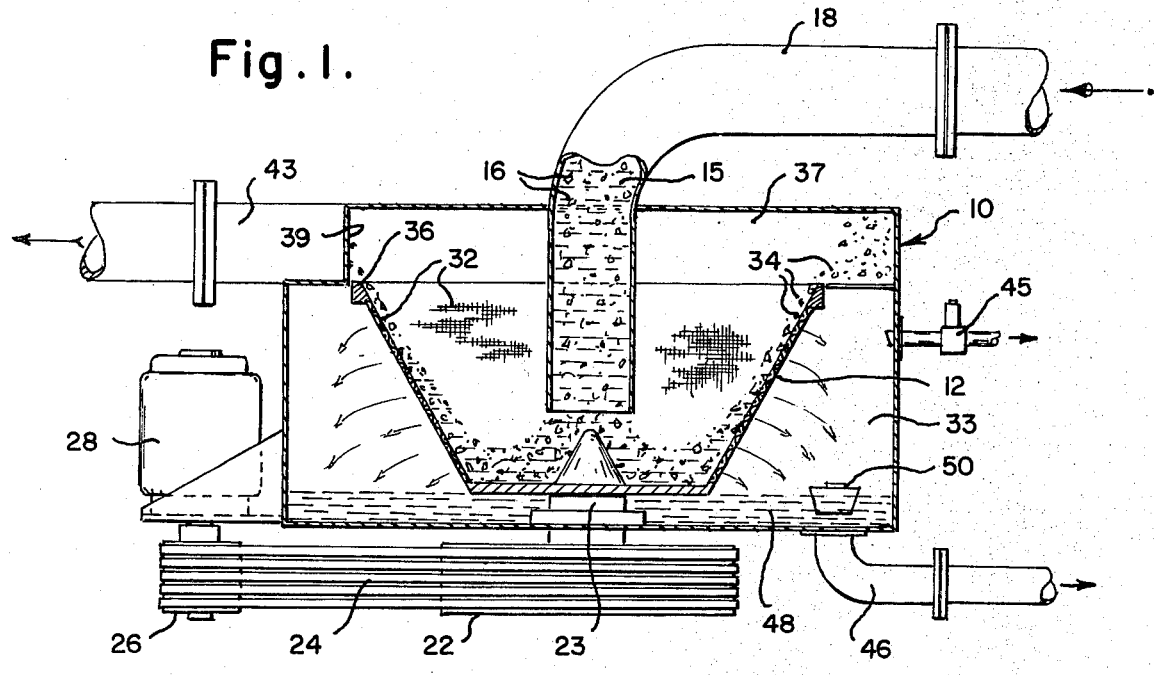
FIG. 1 is a cross-sectional view of the centrifuge apparatus.
Figure 2:
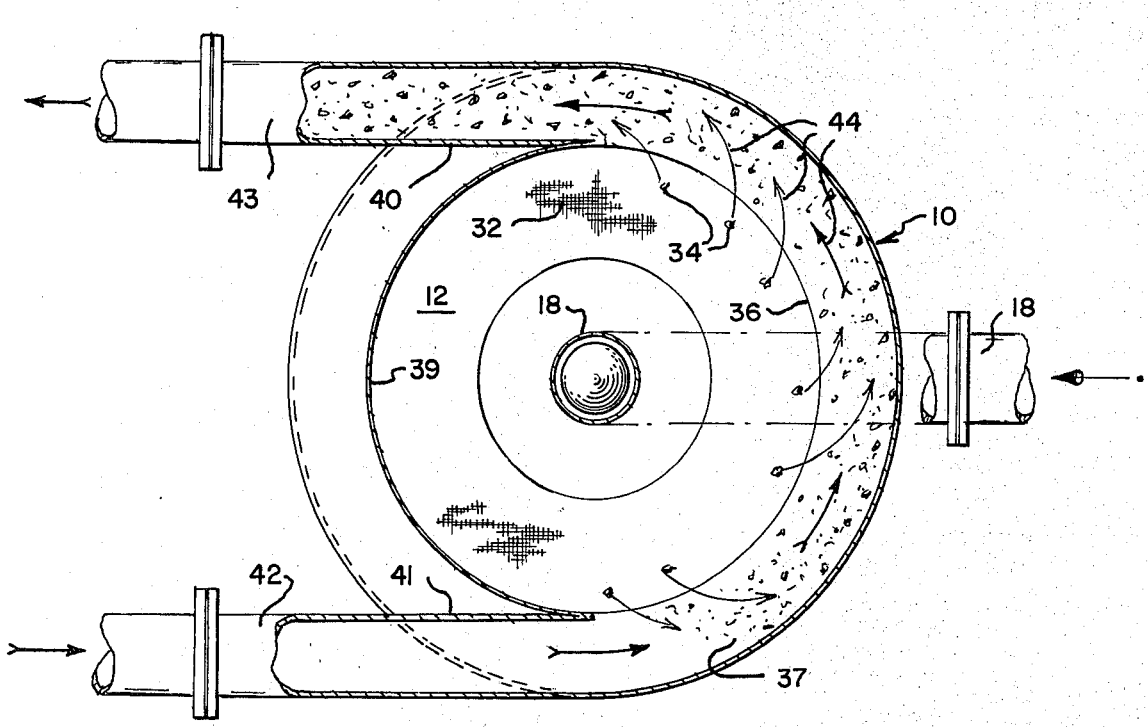
FIG. 2 is a top view of the centrifuge apparatus partially cut away to show the interior of the pick-up chamber.

FIGS. 1 and 2 display a centrifuge apparatus having an air-tight housing 10 in which there is mounted a rotatable centrifuge basket 12. A liquid conveying medium 15 transporting solid particulates 16 is injected through a channeling means 18 into the base of the basket 12. A drive shaft 23 is attached to the basket. The basket is rotated by a motor 28 which is connected to the drive shaft 23 through pulleys 22 and 26 and drive belt 24.

After the basket has achieved a sufficient rotational velocity, droplets of the liquid conveying medium are forced through holes 32 of the basket into a collection chamber 33. Deliquified particulates 34, which are too large to pass through the holes of the basket, accumulate on the inner surface of the basket.

Upon continued rotation of the basket, the deliquified particulates migrate toward the rim 36 bordering the open end of the basket. Upon reaching the rim of the basket, the particulates are expelled into the interior of the pick-up chamber 37 sealed to the air-tight housing 10. The pick-up chamber is open to the basket over an arc of 180° only; a wall 39 is provided around the remainder of the basket circumference. Walls 40 and 41 are also provided adjacent to wall 39 to close off the pickup chamber. Once the deliquified particulates are present within the pick-up chamber, their motion is controlled by a pressurized flow of air injected through an input means 42 and expelled through an output means 43. The deliquified particulates travel in a circumferential manner about the rim of the basket before they are expelled with the pressurized flow of air. The path of the particles is shown by arrows 44 in FIG. 2. Because the pressurized flow of air travels through the pickup chamber in a like circumferential direction with respect to the rotational motion of the basket, the escape of each deliquified particulate from the pickup chamber is abetted by the tangential component of velocity present in the particulate as it leaves the rim of the basket. The radial velocity component present in each particulate is neither abetted nor hindered by the pneumatic path.

Because of the air-tight quality of the apparatus, the pressurized flow of air serving to convey the particulates from the pickup chamber also serves to pressurize the area enclosed by the centrifuge basket. By gradually releasing air from chamber 33 through a bleeder valve 45 located on the wall of the housing, a pressure drop is created through the holes of the basket. This pressure drop promotes the deliquification of the particulates as they come in contact with the wall of the basket.

Attached to the bottom wall of the housing is an output means 46 to provide for the discharge of accumulated water 48 arising from the passage of water droplets through the holes of the basket. Positioned at the junction of the output means and housing wall is a float valve 50 to prevent the escape of air after all accumulated water has been discharged.

THE BACKFILLING METHOD

Figure 3:
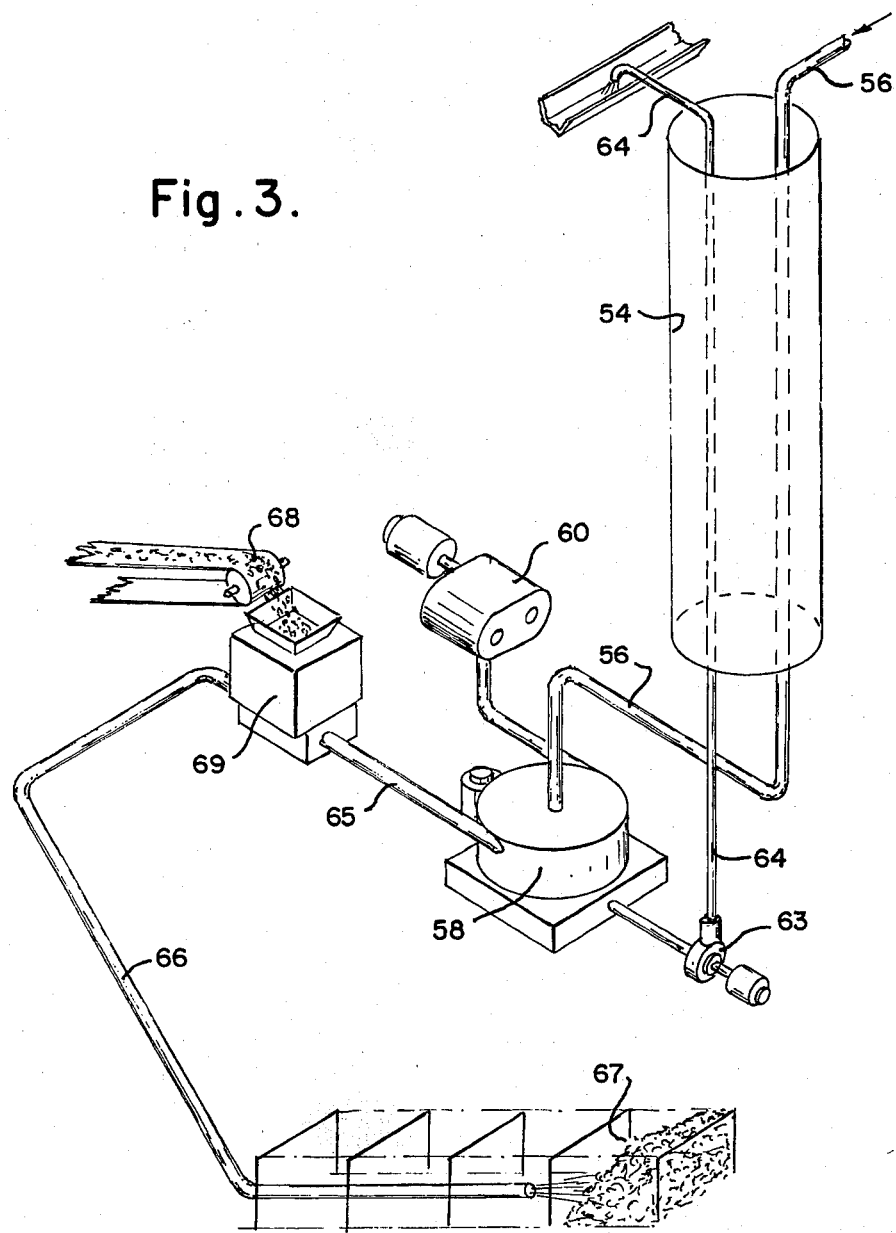
FIG. 3 is a diagram of a typical mining layout utilizing our method of backfilling mine cavities with the aid of our centrifuge apparatus.

FIG. 3 displays a system utilizing our apparatus in backfilling mine cavities. In this system refuse in the form of a slurry of the type from a mineral concentrator travels downward through a vertical mine shaft 54 via a pipeline 56. The slurry is injected into a centrifuge apparatus 58 which deliquifies solid particulates contained by the slurry and transfers them to a pressurized air flow generated by a blower 60. Water extracted from the particulates is propelled by a pump 63 to the surface via a pipeline 64. The pressurized air flow transfers the particulates by a second pipelines 65 and 66 to a cavity 67 into which the particulates are expelled. Enroute to the cavity, the pressurized air flow receives additional refuse matter 68 through an air-lock feeder 69. The combining of the deliquified particulates with this additional material produces a most suitable backfill mixture.

MINERAL TRANSPORTATION METHOD

Figure 4:
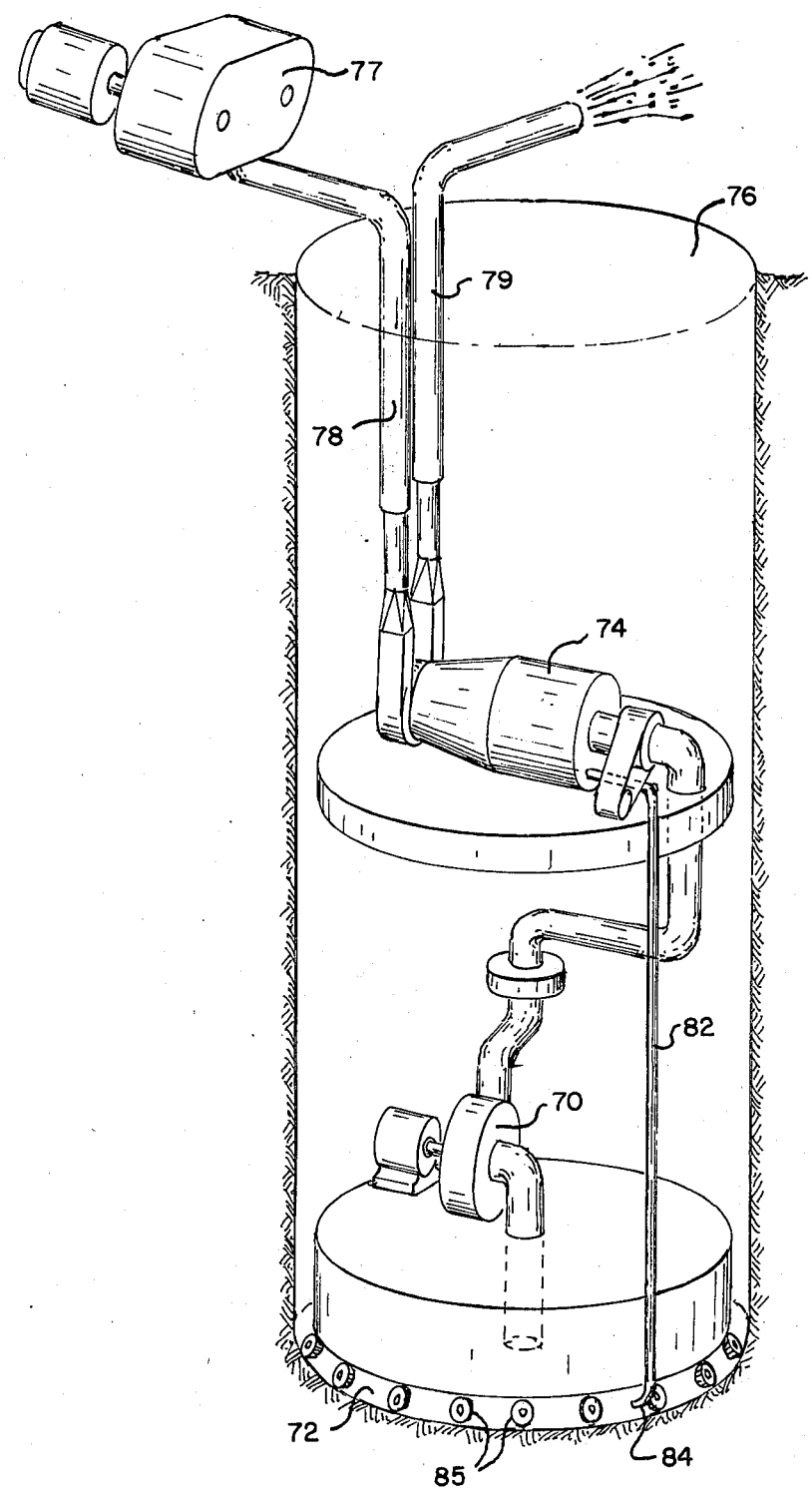
FIG. 4 is a diagram of a typical mining layout utilizing our centrifuge apparatus to hoist cuttings to the shaft surface.

FIG. 4 is a diagram of a mining layout in which a single impeller slurry pump 70 draws in a water-mineral mixture from the working face 72 and conveys the mixture to a centrifuge 74. One may use either a vertical centrifuge such as that shown in FIG. 1 or a horizontal centrifuge such as a Bird horizontal centrifuge which is commonly used in the mining industry. The centrifuge here shown is mounted in a horizontal orientation with respect to the axis of rotation of the centrifuge basket. Pressurized air from blower 77 is conducted down the shaft 76 through an extending pipeline 78 and to the centrifuge from which it receives deliquified mineral particulates. The particulates are hoisted to a desired location such as the shaft entrance through a material conducting, extending pipeline 79. Water extracted from the particulates returns to the working face via a pipeline 82 and is discharged through a jet 84 to flush mineral cuttings from the tool edges 85 of shaft sinking machinery (not shown).

While we have shown and described certain present preferred embodiments of the invention and have illustrated certain preferred methods of practicing the same, it is to be distinctly understood that the invention is not limited thereto but may be otherwise variously embodied and practiced within the scope of the following claims.

We claim:

1. A centrifugal machine for transferring particulates from liquid conveying medium to gaseous conveying medium, comprising:
   (a) an air-tight housing,
   (b) a conical centrifuge basket rotatably mounted at its apex within said housing, said basket being open opposite its apex and having a plurality of holes sized so that a liquid conveying medium may pass through said basket leaving deliquified particulates in contact with the walls of said basket,
   (c) an air-tight pick-up chamber attached to said housing and surrounding the open end of said basket to accumulate deliquified particulates,
   (d) an input means attached to said pick-up chamber for inputting a pneumatic path of gaseous conveying medium around said basket in the same direction as said basket rotates,
   (e) an output means attached to said pick-up chamber for outputting a pneumatic path of gaseous conveying medium, said output means positioned with respect to said input means so as to promote the travel of said pneumatic path through said pick-up chamber in a circumferential manner about the open end of said basket so that deliquified particulates moving with a velocity having a radial component and a tangential component are received by the gaseous conveying medium, the tangential velocity component of said particles is abetted by the pneumatic path of the gaseous conveying medium and the radial velocity component of said particles is neither abetted nor hindered by the pneumatic path of the gaseous conveying medium, and
   (f) a channeling means attached to the exterior of the apparatus by which a liquid conveying medium is injected into the base of said centrifuge basket.

2. The apparatus recited in claim 1 further comprising a drive means attached to said housing and said basket to provide for rotation of said basket.

3. The apparatus recited in claim 1 or 2 further comprising a bleeder valve attached to the wall of said housing and positioned so that when open, a pressure drop will be created through said holes of said basket thereby promoting passage of gaseous conveying medium through said holes of said basket.

4. The apparatus recited in claim 1, 2, or 3 further comprising an output means attached to said housing to promote the expulsion of liquid conveying medium from the apparatus and a valve attached to said output means to prevent expulsion of gaseous conveying medium from the apparatus.

5. The apparatus recited in claim 1, 2, 3, or 4 wherein the pick-up chamber is open only to the rim of the basket over the distance of an arc determined by the direct travel of the pneumatic path from the input means to the output means.

6. A method of providing for the continuous transfer of particulates form a liquid conveying medium to a gaseous conveying medium, comprising the steps of:
   (a) injecting a liquid conveying medium into an inverted cone-shaped perforated centrifuge basket,
   (b) rotating said basket at a sufficient velocity for a sufficient period of time to expel said liquid conveying medium through perforations in said basket,
   (c) further rotating said basket at a sufficient velocity for a sufficient period of time to promote the travel of deliquified particulates within said basket toward an open end of said basket, said open end located opposite the apex of said basket,
   (d) injecting a gaseous conveying medium traveling in a pneumatic path into a channel surrounding the open end of said basket so that the path of the gaseous conveying medium is moving in a direction which conforms to the rotation of said basket,
   (e) collecting said particulates moving with a velocity having a radial component and a tangential component with said gaseous conveying medium traveling in a pneumatic path in a manner so that the tangential velocity component of said particles is abetted by the pneumatic path of the gaseous conveying medium and the radial velocity component of said particles is neither abetted nor hindered by the pneumatic path of the gaseous conveying medium with said gaseous conveying medium traveling in a pneumatic path, and;
   (f) pneumatically conveying said gaseous conveying medium from the apparatus.

7. The method recited in claim 6 further comprising the step of bleeding the gaseous conveying medium from the apparatus in such a manner so as to create a pressure drop through holes in the centrifuge basket.

8. The method recited in claim 6 or 7 further comprising the step of expelling said liquid conveying medium.

* * * * *